UNITED STATES PATENT OFFICE.

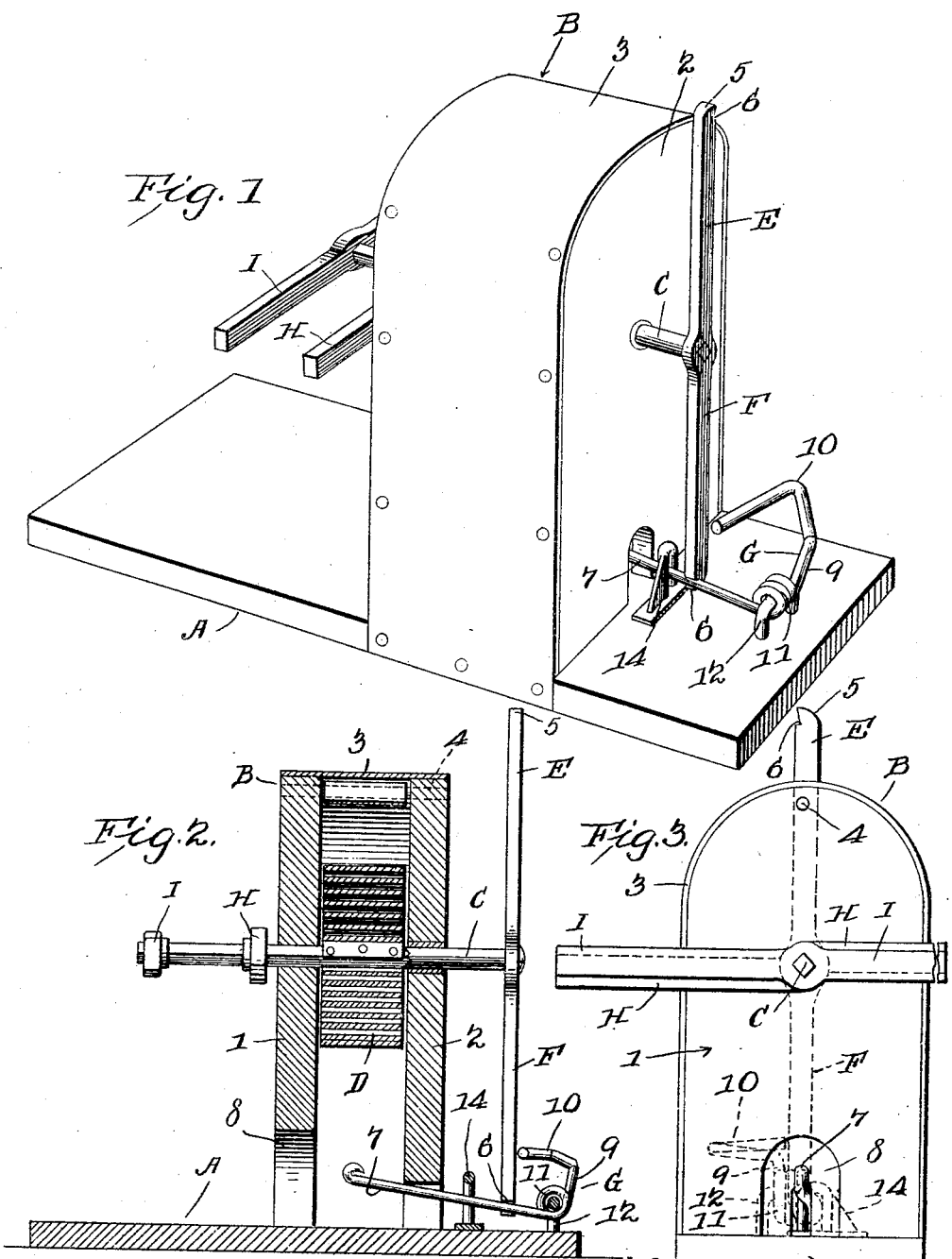

JOHN M. GUNN, OF GIRARD, ILLINOIS, ASSIGNOR OF ONE-FOURTH TO JOHN R. BURRIS AND ONE-FOURTH TO FRED O. BURRIS, OF GIRARD, ILLINOIS.

ANIMAL-TRAP.

941,988.  Specification of Letters Patent.  Patented Nov. 30, 1909.

Application filed December 18, 1908. Serial No. 468,202.

*To all whom it may concern:*

Be it known that I, JOHN M. GUNN, a citizen of the United States, residing at Girard, in the county of Macoupin and State of Illinois, have invented a new and useful Animal-Trap, of which the following is a specification.

This invention relates to animal traps such as are provided with a spring-actuated lever adapted to strike and kill an animal.

The object of the invention is to provide a simple and improved trap of the character specified which is provided with efficient means for killing an animal and removing the body and which is adapted to operate, without rewinding the spring, for practically twice as long as any spring-actuated trap heretofore constructed.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

In the accompanying drawings forming part of this specification: Figure 1 is a perspective view of a trap constructed in accordance with the present invention. Fig. 2 is a vertical longitudinal section thereof. Fig. 3 is a front elevation.

Like reference characters indicate corresponding parts in the different figures of the drawings.

The reference letter A designates a base which may be of any suitable form and construction. Mounted upon the base A is an upright B which preferably consists of a pair of spaced members 1 and 2 which are covered by a housing 3.

Extending through the upright B and suitably journaled therein is a main shaft C. The operating mechanism for the main shaft C preferably consists of a helical spring D which is suitably arranged between the spaced members 1 and 2 and is connected at its inner end with the shaft C, the outer end of said spring D being connected with a pin 4.

At what I shall term its rear end, the main shaft C is provided with a plurality of setting levers E—F which preferably are two in number and are formed integral with each other, said levers extending outward from different sides of the shaft, as shown. Each of the setting levers E and F is formed with a beveled outer end 5 and a notched portion 6 adjacent the beveled end.

Each of the setting levers E and F is adapted to be engaged and held by a suitable releasing and tripping device designated generally by G. The releasing and tripping device G preferably consists of a bait-holding arm 7 which projects in a forward direction through the animal passage 8 formed in the lower end of the upright B. In addition to the bait-holding arm 7, the releasing and tripping device G also includes an arm 9 which extends approximately at a right angle with respect to the arm 7 and is bent at its upper end to form an approximately V-shaped cam portion 10. The arms 7 and 9 preferably are formed integral with each other from a single piece of wire which is bent or curled intermediate its ends, as indicated at 11, to form a pivot point for the arms 7 and 9, the curled pivot point 11 being suitably engaged with a staple or other equivalent device 12 mounted in the base 1. The bait-holding arm 7, in rear of the animal passage 8, extends through a guiding device or staple 14 which permits the arm to move vertically but prevents any lateral movement thereof. The action of this part of the device is as follows: The setting levers E—F are suitably rotated to place the helical spring D under proper tension. The bait-holding arm 7 of the releasing and tripping device G is then supplied with a suitable piece of bait and raised slightly so as to fit into the notched portion 6 of one of the setting levers. Whenever an animal tampers with the bait, as will be apparent, the bait-holding arm 7 is depressed, so as to release the setting lever with which it is engaged and permit the main shaft C to make one-half of a revolution, until the other setting lever strikes the V-shaped cam portion 10 of the arm 9 and rocks the same rearwardly out of the path of movement of said setting lever, whereby the bait-holding arm 7 is raised into the path of movement of said lever and engages the notched portion 6 thereof so as to prevent further rotation of the shaft.

From the foregoing description it will be apparent that the improved releasing and tripping device G, which is formed in one piece, is adapted automatically to set itself without the aid of springs or other similar devices.

The means for killing the animal which has thrust its head partially into the animal passage 8 of the upright B, preferably comprises a plurality of striking levers H—H which are connected with the main shaft C in any suitable manner and preferably are formed integral with each other so as to extend in opposite directions. The striking levers H—H preferably extend at an approximate right angle with respect to the setting levers E—F, as shown, and are disposed close to the front face of the upright B, whereby the front end of the animal passage 8 will form an abutment which will serve to hold the head of the animal in position to be fatally struck by one or the other of the striking levers H—H.

The means for removing the body of the animal, so as to prevent it from clogging the trap, consists preferably of a pair of removing levers I—I which are spaced away from the striking levers H by a distance equal to about half the length of an animal's body and are approximately parallel with said striking levers, as shown, the removing levers I being preferably formed integral with each other.

From the foregoing explanation it will be apparent that whenever the animal steps upon the base A and nibbles at the bait on the releasing and tripping device, the striking levers H and removing levers I will make a swift half revolution, thus killing the animal and throwing its body away from the trap. By reason of the fact that the setting levers E—F are so arranged as to permit only a half revolution of the main shaft C, it will be obvious that the helical spring D will require to be wound only half as often as the spring in a trap in which the striking lever is permitted to make one complete revolution each time the bait is touched. Furthermore, it will be apparent that the removing levers I—I will remove the body of an animal more effectively than where the striking lever is depended upon to perform not only the function of killing the animal but also to throw its body away from the trap.

The improved animal trap of this invention is strong, simple, durable and inexpensive in construction as well as thoroughly efficient in operation.

What is claimed is:

1. An animal trap comprising parallel striking and removing levers, a setting lever movable therewith, a bait-holding device normally in the path of the setting lever and means for automatically rotating all of the levers when the setting lever is released, to move the striking and removing levers simultaneously against an animal, and means operated by the setting lever while in motion for returning the bait-holding device into the path of the setting lever.

2. An animal trap comprising a striking lever, a setting lever revoluble therewith, a bait-holding device normally in the path of the setting lever, means for automatically rotating the levers upon the release of the setting lever from the bait-holding device, and means operated by the setting lever during the movement thereof for returning the bait-holding device into the path of the setting lever.

3. An animal trap comprising a base, an upright on said base having an animal passage in its lower end, a spring carried by said upright, a main shaft connected with said spring, a plurality of oppositely extending striking levers and removing levers which are parallel with each other, the striking levers being disposed in front of the upright closely adjacent thereto, a plurality of oppositely extending setting levers in rear of said upright, disposed at a right angle with respect to the striking and removing levers, and a releasing and tripping device comprising a forwardly extending bait-holding arm and an upwardly extending second arm having a cam portion at its upper end, said bait-holding arm and second arm being integral with each other and formed with a curled pivot point, a staple engaging said curled pivot point and a guiding device straddling the forward end of the bait-holding arm which projects into the animal passage of the upright.

In testimony that I claim the foregoing as my own, I have hereto affixed my signature in the presence of two witnesses.

JOHN M. GUNN.

Witnesses:
 FRANK D. ALLEN,
 GEO. H. WATERS.